(12) United States Patent
Chen et al.

(10) Patent No.: US 9,710,052 B2
(45) Date of Patent: *Jul. 18, 2017

(54) DYNAMIC ENERGY SAVINGS FOR DIGITAL SIGNAL PROCESSOR MODULES USING PLURAL ENERGY SAVINGS STATES

(71) Applicant: Cisco Technology, Inc., San Jose, CA (US)

(72) Inventors: Ming Chen, Fremont, CA (US); Prasad Miriyala, Union City, CA (US); Ramakrishnan Kunnath, Milpitas, CA (US); Jing Li, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 240 days.

This patent is subject to a terminal disclaimer.

(21) Appl. No.: 14/715,049

(22) Filed: May 18, 2015

(65) Prior Publication Data

US 2015/0253843 A1 Sep. 10, 2015

Related U.S. Application Data

(63) Continuation of application No. 12/751,491, filed on Mar. 31, 2010, now Pat. No. 9,043,585.

(51) Int. Cl.
*G06F 9/30* (2006.01)
*G06F 1/32* (2006.01)
*G06F 9/50* (2006.01)

(52) U.S. Cl.
CPC .......... *G06F 1/3287* (2013.01); *G06F 1/3203* (2013.01); *G06F 1/3209* (2013.01); *G06F 9/30083* (2013.01); *G06F 9/5094* (2013.01); *Y02B 60/1278* (2013.01); *Y02B 60/1282* (2013.01); *Y02B 60/142* (2013.01); *Y02B 60/32* (2013.01)

(58) Field of Classification Search
None
See application file for complete search history.

(56) References Cited

U.S. PATENT DOCUMENTS

| 6,009,507 | A | 12/1999 | Brooks et al. |
| 6,883,102 | B2 | 4/2005 | Williams, III et al. |
| 7,200,692 | B2 | 4/2007 | Singla et al. |

(Continued)

OTHER PUBLICATIONS

Dusit Niyato, Sivadon Chaisiri, Lee Bu Sung, "Optimal Power Management for Server Farm to Support Green Computing", CCGRID, 2009, Cluster Computing and the Grid, IEEE International Symposium on, Cluster Computing and the Grid, IEEE International Symposium on 2009, pp. 84-91.

*Primary Examiner* — William B Partridge
(74) *Attorney, Agent, or Firm* — Patterson + Sheridan LLP

(57) ABSTRACT

Embodiments include a method of managing operating states of a plurality of digital signal processors (DSPs). The method generally includes determining a first number of the plurality of DSPs to operate in a ready state, determining a second number of the plurality of DSPs to operate in a first energy-saving state, and determining a third number of the plurality of DSPs to operate in a second energy-saving state. In some embodiments, the first energy-saving state corresponds to a dormant mode of the DSPs, and the second energy-saving state corresponds to a reset mode of the DSPs.

19 Claims, 5 Drawing Sheets

(56) References Cited

U.S. PATENT DOCUMENTS

| | | |
|---|---|---|
| 8,347,119 B2 | 1/2013 | Song |
| 2004/0148533 A1 | 7/2004 | Nicholas |
| 2006/0265617 A1 | 11/2006 | Priborsky |
| 2010/0153761 A1 | 6/2010 | Nishioka |
| 2010/0223385 A1 | 9/2010 | Gulley et al. |
| 2011/0246749 A1* | 10/2011 | Chen .................... G06F 1/3203 712/35 |

* cited by examiner

US 9,710,052 B2

DYNAMIC ENERGY SAVINGS FOR DIGITAL SIGNAL PROCESSOR MODULES USING PLURAL ENERGY SAVINGS STATES

CROSS-REFERENCE TO RELATED APPLICATIONS

This application is a continuation of the co-pending U.S. patent application Ser. No. 12/751,491, filed Mar. 31, 2010, entitled "Dynamic Energy Savings for Digital Signal Processor Modules Using Plural Energy Savings States," which is herein incorporated by reference.

TECHNICAL FIELD

The present disclosure relates generally to energy savings.

BACKGROUND

Energy savings are desirable for many reasons such as cost and environmental benefits. Some solutions can have performance drawbacks. For example, after powering down a computing device, there can be an unacceptable delay from when power is restored to the computing device and when the device is ready to be used. For example, the computing device may not be ready until it executes its boot code and loads the appropriate code, which it may have stored at a locally accessible memory or may have to download from an external device.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
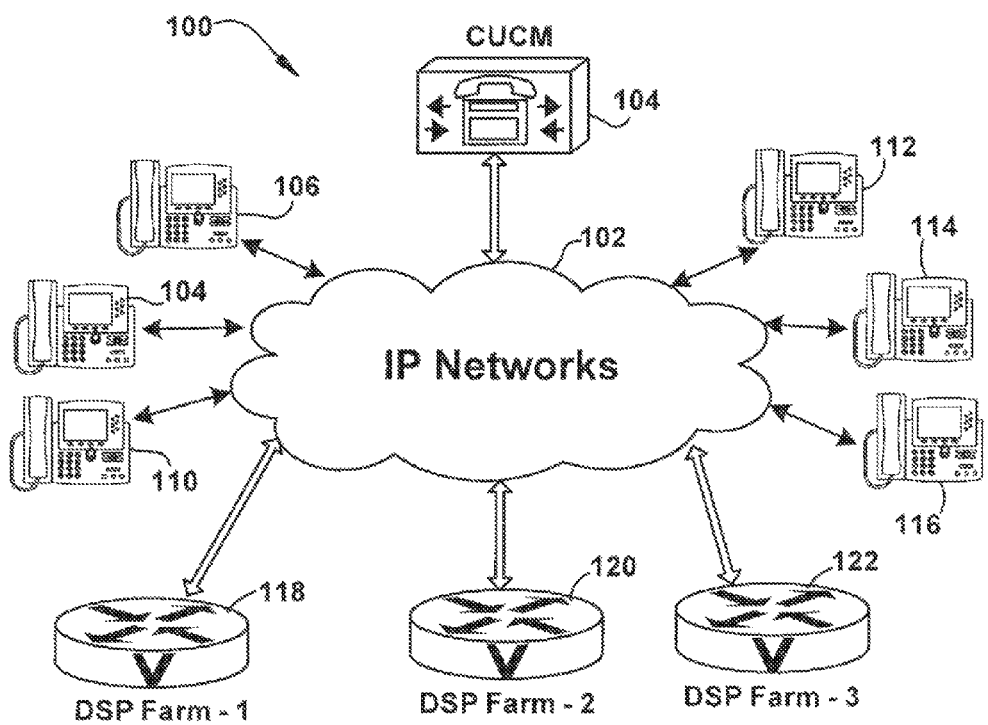
FIG. 1 illustrates an example of network with a plurality of Digital Signal Processor farms.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In one example embodiment, a method is disclosed for managing operating states of each of a plurality of digital signal processors (DSPs). Each operating state is selected from a group of at least three operating states that includes a ready state, a first energy-saving state, and a second energy-saving state. The method includes receiving one or more digital signal processing tasks, and determining a first number of the plurality of DSPs to operate in the ready state to handle the received digital signal processing tasks. The method further includes determining a second number of the plurality of DSPs to operate in the first energy-saving state, wherein DSPs operated in the first energy-saving state are configured to transition to operation in the ready state within a predetermined amount of time. The method further includes determining a third number of the plurality of DSPs to operate in the second energy-saving state, and signaling each of the plurality of DSPs to operate in a respective operating state consistent with the determined first, second, and third numbers.

In another example embodiment, there is disclosed herein, an apparatus, comprising an interface for communicating with a plurality of digital signal processors and logic coupled to the interface and operable to send and receive data via the interface. The logic is configured to determine an operating state for each of the plurality of digital signal processors, wherein the operating state is selected from a group comprising a ready state, a first energy saving state, and a second energy saving state. The logic determines a first number of digital signal processors selected from the plurality of digital signal processors to operate in a ready state, a second number of digital signal processors to operate in a first energy saving state, and a third number of digital signal processors to operate in the second energy saving state. The logic selects a first set of digital signal processors to be maintained in the ready state corresponding to the first number of processors and signals the first set of digital signal processors via the interlace to operate in the ready state. The logic selects a second set of digital signal processors to be maintained in the first energy saving state corresponding to the second number of processors and signals the second set of digital signal processors via the interface to operate in the first energy saving state. The logic selects a third set of digital signal processors to be maintained in the second energy saving state corresponding to the third number of processors and signals the third set of digital signal processors via the interface to operate in a second energy saving state. The logic determines the first number, second number, and third number of digital signal processors based on current system load, time to transition from the first energy state to the ready state, and the time to transition from the second energy state to the ready state.

In another example embodiment, there is disclosed herein, a method comprising determining operating states for a plurality of digital signal processors, wherein there are at least three operating states, the first operating state being a ready state, the second operating state being a first energy saving state, and the second operating state being a second energy saving state. The determining operating states comprises determining a first number of digital signal processors to be maintained in a ready state for handling current digital signal processing tasks and further comprises determining a second number of digital signal processors to be maintained in a first energy saving state that can switch to a ready state within a predetermined time. A first set of digital signal processors are selected from the plurality of digital signal processors to be maintained in the ready state corresponding to the first number of processors. A second set of digital signal processors are selected from the plurality of digital signal processors to be maintained in the first energy saving state corresponding to the number of processors to be maintained in the first energy saving state. Any digital signal processors that are not in the ready state or the first energy save state are maintained in one of the remaining energy saving states.

In another example embodiment, there is disclosed herein, logic encoded in at least one tangible media for execution and when executed operable to determining operating states for a plurality of digital signal processors, wherein there are at least three operating states, the first operating state being a ready state, the second operating state being a first energy saving state, and the second operating state being a second energy saving state. The determining operating states comprises determining a first number of digital signal processors to be maintained in a ready state, and determining a second number of digital signal processors to be maintained in a first energy saving state. The logic is further operable to select a first set of digital signal processors from a plurality of digital signal processors to be maintained in the ready state corresponding to the first number of processors. The logic is also operable to select a second set of digital signal processors from the plurality of digital signal processors to be maintained in the first energy saving state corresponding to the number of processors to be maintained in the first energy saving state. The logic is operable to maintain any digital signal processors that are not in the ready state or the first energy save state in a selected one other energy saving state.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 illustrates an example of a system 100 comprising a network (or networks) 102 with a plurality of Digital Signal Processor (DSP) farms 118, 120, 122. Call manager apparatus (for example as illustrated a CISCO Unified Call Manager "CUCM" available from Cisco Systems, Inc., 170 West Tasman, San Jose, Calif. 95134) manages telephone calls involving at least one of telephones 106, 108, 110, 112, 114, 116 and allocates digital signal processing resources from DSP farms 118, 120, 122. Note that the number of telephones, DSP farms, networks and call managers illustrated in FIG. 1 were selected for illustrative purposes to describe example embodiments and those skilled in the art should readily appreciate that any physically realizable number of telephones, DSP farms, networks and call managers may be employed in accordance with an example embodiment.

In an example embodiment, call manager 104 suitably comprises an interface (not shown, see for example FIG. 7) enabling call manager 104 to communicate with telephones 106, 108, 110, 112, 114, 116, DSP farms 118, 120, 122, (and as will be illustrated herein infra DSPs within DSP farms 118, 120, 122, and any other devices (not shown) on network 102.

In an example embodiment, call manager 104 suitably comprises logic that can send and receive data via the interface for implementing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor (see for example processor 704 in FIG. 7).

Figure 2:
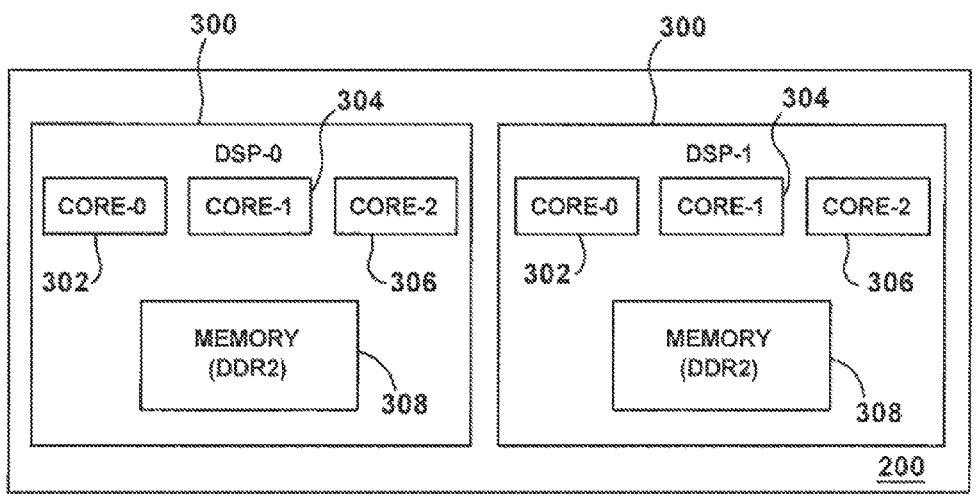
FIG. 2 illustrates a simplified functional diagram of a Packet Voice/Video Digital Signal Processor module.

In an example embodiment, DSP farms 118, 120, 122 suitably comprise at least one Packet Voice DSP Module (PVDM). Referring to FIG. 2 with continued reference to FIG. 1, there is illustrated an example of a simplified functional block diagram of a PVDM 200 suitable for implementing an example embodiment. PVDM 200 comprises two Digital Signal Processors 300. Each DSP 300 comprises three DSP cores 302, 304, 306 and a memory 308. Thus, in the illustrated example, DSP 300 has 6 DSP cores. In an example embodiment, logic in call manager 104 treats each core as an individual DSP. In an example embodiment, firmware downloads and hard resets are only issued to core-0 302, but are passed down to cores 304, 306 within DSP 300.

Figure 3:
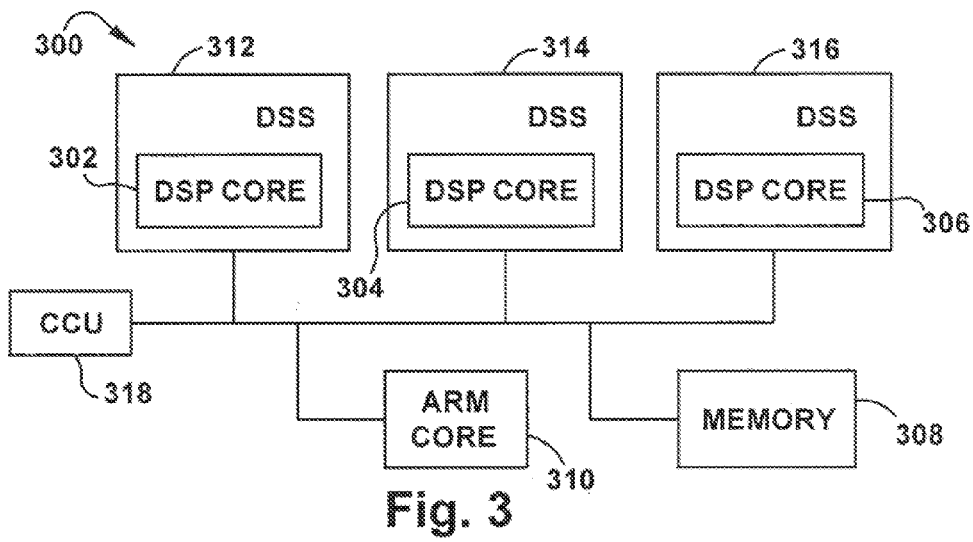
FIG. 3 illustrates a simplified functional diagram of a digital signal processor.

Referring to FIG. 3 with continued reference to FIGS. 1 and 2, there is illustrated a simplified functional block diagram of a DSP 300 suitable for implementing an example embodiment. DSP 300 is suitable for employment in PVDM 200 and any of server farms 118, 120, 122. DSP 300 comprises digital signal subsystems (DSSs) 312, 314, 316 each having a DSP core 302, 304, 306 respectively. DSP 300 further comprises an Advanced RISC Machine (ARM; a 32 bit reduced instruction set computer (RISC) instruction set architecture (ISA)) core 310, memory 308, and a clock control unit (CCU) 318 that controls the clock within DSSs 312, 314, 316, ARM core 312 and memory 308. In an example embodiment, memory 308 is a Double Data Rate (DDR) memory.

As will be illustrated herein in various example embodiments, there are several suitable techniques that may be employed for saving power. For example, an individual DSS may be entered into a low power mode. CCU (Clock Control Unit) 318 which controls clocks within each of DSS 312, 314, and 316 allows a core (e.g. one of DSP cores 302, 304, or 306 and core subsystem peripherals to enter a low-power mode responsive to a wait stop instruction executed by the core. The DSP core continues from the instruction following the wait stop instruction upon exiting the low-power mode. In this case, however, the ARM core is still running at its normal clock speed.

As another example, a clock that is supplied to DSP cores 302, 304, 306 (corresponding to DSS 312, 314, 316 respectively), ARM core 310 and Memory 308 switches to a lower speed, and thus achieves power savings. This mode would provide higher power saving than setting one or more of the DSSs 312, 314, 316 in low-power mode as this mode lowers the power consumption for the whole DSP 300 versus only the lower power consumption in a DSS unit (or multiple DSS units).

As yet another example, a PVDM may be put in reset mode. In reset mode, DSP 300 stops executing and hence only consumes a small amount of leakage current. In reset mode, however, DSP 300 is restarted and downloads the firmware before DSP 300 can be used for processing. Thus, although reset mode realizes the highest amount of power savings, it takes longer for DSP 300 to return to a normal operating mode.

Illustrated below in Table 1 is an example of potential power consumption for a PVDM employing two DSPs. Each DSP employs a DDR memory. In this example, and the clocks applied to the DSP cores, DDR and ARM may be at different speeds.

TABLE 1

| Operating Mode | Power (Watts) | Power Saving (Watts/%) |
| --- | --- | --- |
| Normal Operation @ 550 MHZ | 5.54 | 0 |
| Idle @ 200 MHZ, DDR active (assume 200 MHZ still allow ARM monitor/handle voice signaling) | 3.56 | 1.98/36% |
| Idle @ 25 MHZ, DDR active | 2.28 | 3.28/59% |
| Idle @ 25 MHZ, DDR inactive | 1.73 | 3.81/69% |
| Standby (ARM core is still clocked @ 25 MHz, but DSS is halted), DDR inactive | 1.21 | 4.33/78% |
| Devices held in reset | 0.74 | 4.80/87% |

From the foregoing, the best power savings are achieved when the PVDM is held in reset mode. Some significant power savings can be still be achieved without putting the PVDM in reset mode.

In accordance with an example embodiment, call manager 104 may employ a dynamic energy wise algorithm to achieve energy savings. The algorithm can use existing board and chip design to achieve energy savings.

In example embodiments, the algorithm can manage a pool or multiple pools of multi-service DSPs in a system or in a distributed system. The algorithm can save power in a daily network operation without end user involvement and without sacrificing services to an existing network deployment. This concept can be applied to any voice or video network with DSPs.

In an example embodiment, the algorithm maintains 3 states for DSP's, a ready state, a dormant state and a reset state. In the ready state, the DSP is available to provide immediate service for voice and video calls without DSP ramp-up time. In the dormant (first power saving) state, the DSP is not in a normal operating state or in a reset state, for example in an idle state employing a reduced clock speed. This state has a ramp up time before the DSP can provide service for voice and video calls. In an example embodiment, the ramp up time in the dormant state is quicker, e.g., around 1 ms, for a DSP to switch to the "Ready" state than from a reset state. The third state is the reset (or second power saving) state as described herein. In reset mode (which as described above provides the best power savings), however, in an example embodiment the ramp-up time may be a few seconds after signaling the DSP to switch over to the 'Ready' state. It should be noted that the algorithm is not limited to three states, as any number of different states may be employed. Referring to Table 1 above for example, the algorithm may include an active (normal operating) state, a reset state, and a plurality of dormant states (e.g., idle and/or inactive). In the example illustrated in Table 1 the dormant states comprise idle states with reduced clock speeds such as 200 MHZ (with DDR memory active), 25 MHZ (with DDR memory active), 25 MHZ (with DDR memory inactive), and an inactive state with a clock speed of 25 MHZ (with DSS halted and DDR memory inactive). As another example, an additional power save state may be employed, such as where power is removed from the DSP, however, as those skilled in the art can readily appreciate, this would result in an even longer ramp up time than the reset state. Moreover, depending on whether applications can tolerate the time delay from reset mode to active mode, or if there are insufficient DSPs installed in a network the reset state may be disabled.

Figure 4:
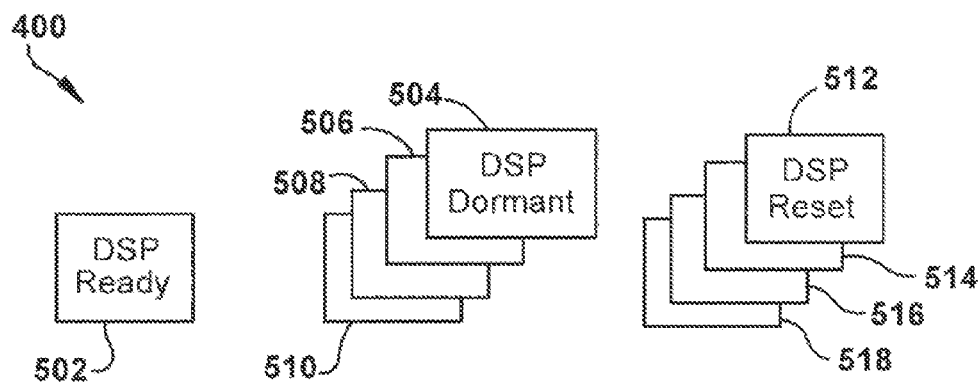
FIG. 4 illustrates an example of a set of digital signal processing resources in a first state.
Figure 5:
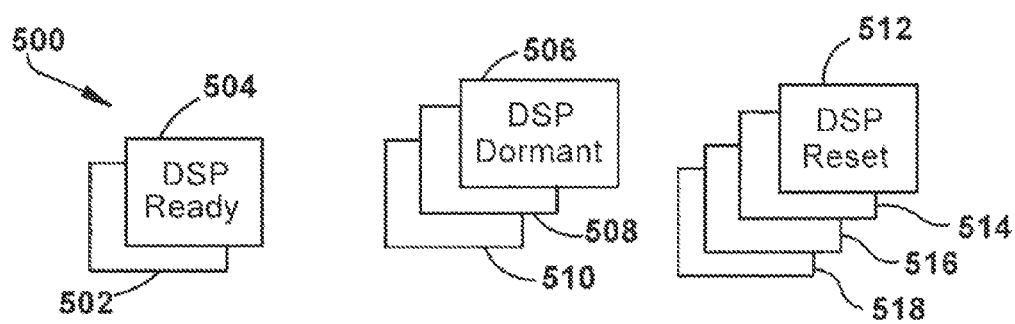
FIG. 5 illustrates an example of the set of digital signal processing resources in FIG. 4 in a second state.
Figure 6:
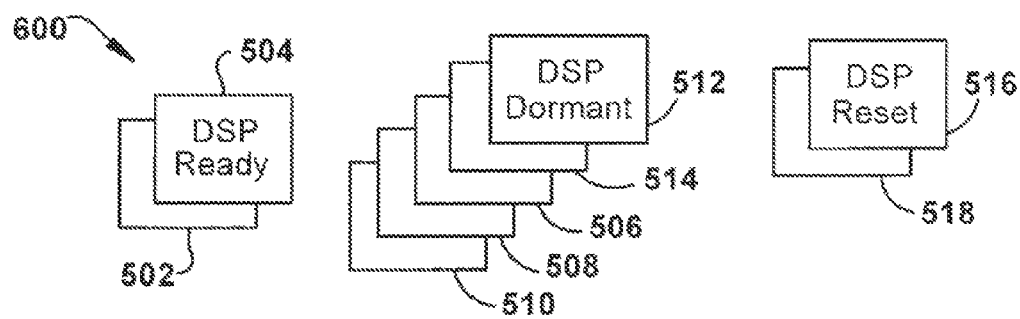
FIG. 6 illustrates an example of the set of digital signal processing resources in FIG. 4 in a third state.

The algorithm determines how many DSPs should be in each state based on current demands. For example, at night when a phone system may have minimal usage, more DSPs may be put in a reset state than in the daytime where call surges may require DSPs to transition to the ready state quicker. For example, FIG. 4 illustrates an example of digital signal processing resources in a first state 400 where one DSP 502 is in the ready state, four DSPs 504, 506, 508, 510 are in the dormant state, and four DSPs 512, 514, 516, 518 are in the reset state. As call volume increases, DSP 504 is transitioned to the ready state as illustrated in FIGS. 5 and 6. If the algorithm determines there is a sufficient number of DSPs 506, 508, 510 remaining in the dormant state, then as illustrated in state 500 in FIG. 5 none of DSPs 512, 514, 516, 518 are transitioned out of the reset state. FIG. 6 illustrates an example where the algorithm determines that more digital signal processing resources should be placed in the dormant state; therefore, DSPs 512 and 514 are transitioned from the reset state to the dormant state as illustrated in state 600.

In an example embodiment, if a DSP is servicing a call, the DSP will remain in the 'ready' state until all calls on the DSP are cleared before it can be put into dormant state. The algorithm can continue pick a DSP that is servicing a call that has free resource to service a new voice/video call instead of load balancing DSPs. As time goes by, as calls are completed and/or dropped and there are no calls being serviced by a DSP, then the DSP is a candidate to be put into dormant state for power savings. The algorithm may consider holding incoming calls for a short period of time to enable ramping up of a DSP from 'dormant' to 'ready' state when there is a surge in the number of calls arriving. In an example embodiment, a number of DSPs can form a DSP pool.

In an example embodiment, PVDM DSPs, such as DSP 300, are employed for many different digital signal processing tasks including but not limited to analog signal processing Primary Rate Interface (PRI) service, Time Domain Multiplexing (TDM) termination (also known as TDM-IP "Internet Protocol" calls), and for DSP Farm transcoding and conferencing services (also known as IP-IP services). The algorithm may consider the type of digital signal processing being provided by a PVDM DSP for determining which DSPs can be put in a dormant mode and which DSPs can be put in a reset mode.

For example, TDM termination requires resources for signaling and voice traffic. Some implementations do not use DSP resources for signaling (for example, PRI voice); voice channels reserve DSP resource dynamically. A signaling DSP will be the best candidate to be placed into 'ready' state. DSPs allocated for signaling channels can be considered, however, for a power saving mode by lowering dock rate (for example to 200 MHZ).

As another example, DSP Farm services guarantee services in a way that the DSP resources are allocated before DSP Farm sessions are setup. From a resource point of view, DSP Farm resources are allocated statically and registered with a call manager.

Theoretically DSP IP services do not require signaling channels; however, some protocols still allocate signaling channels from a DSP for accounting purposes even though DSP will not act on the 'dummy' signaling channels. As far as power saving is concerned, a DSP that is employed for Farm signaling can be put into 'dormant' state; however, a DSP performing TDM signaling should be in the 'ready' state, Therefore, the algorithm may considering separating these types of signaling tasks (e.g. DSP Farm and TDM) on to different DSPs.

If both TDM termination and DSP Farm services share the same DSP, the DSP should probably not be put in a 'reset' state because of the time it takes to switch from the 'reset' state to the 'ready' state. Therefore, DSPs performing DSP farm services may be limited to the 'ready' and 'dormant' states.

As yet another example, for PRI service, a DSP may only provide voice termination service but not signaling service. Some protocols may allocate 'dummy' signaling channels for PRI. Therefore, from an energy savings point of view, PRI service is the same as DSP Farm service, hence a PRI signaling DSP can be put into 'dormant' state.

A DSP performing analog voice service is considered similar to a DSP performing digital voice service. Therefore, a DSP performing analog voice signaling should remain in the ready state.

In an example embodiment, some of the following events trigger the algorithm. For example, configuration of the algorithm which may specify a number of DSP credits (resources) that should be maintained in ready mode. The configuration may further specify a number of DSP credits (or resources) that can be placed in the dormant mode, allowing the algorithm to determine the number of DSPs that can be put in the 'dormant' mode and 'reset' mode. These configurations may dynamically or received via a command line interface (CLI). A configuration may specify resources for PRI/DSP Farm services such as allocating dummy signaling channels, DSPs reserved for dummy signaling channels may be placed in the dormant state. A configuration may further specify DSP resources for TDM services, for example a DSP servicing a signaling channel is maintained in a ready state. A new call setup may trigger bringing a DSP from a 'dormant' state to the 'ready' state and/or trigger bringing a DSP from the 'reset' state to a 'dormant' state. The termination of a call may trigger transitioning a DSP from the 'ready' state to a 'dormant' state and/or transition a DSP from a 'dormant' state to the 'reset' state.

Referring again to FIG. 1, in an example embodiment each DSP Farm server 118, 120, 122 registers its DSP Farm profiles/resources to call manager 104. Call manager thus can determine a DSP resource availability topology for the entire network. From a power saving perspective, call manager 104 may decide to shutdown DSP Farm service, for example DSP Farm 118 and 120, and leave DSP Farm 122 in service during the night. The 'shutdown' event can be interpreted as putting DSPs 118, 120 into the 'reset' state.

A DSP Farm shutdown event may be conveyed by Skinny Call Control Protocol (SCCP), Cisco Discovery Protocol (CDP; available from Cisco Systems, Inc., described herein supra) or any suitable protocol. Once a 'shutdown' event is received by a DSP Farm, DSPs associated with the farm profile will be put into 'reset' mode. However, if a particular DSP is shared by a DSP Farm service and other services, the DSP may not be put in 'reset' mode in order to avoid interruption to other services. This can be avoided by separating DSPs allocated for DSP Farm services from other DSP services. When call manager 104 decides to restore a DSP Farm, for example at the beginning of day, a DSP 'restore' event can be sent to the DSP Farm server. The DSP Farm server, responsive to receiving the 'restore' event will bring the DSP for the farm profile from 'reset' to 'ready' or 'dormant' state, and from then on each DSP Farm router can run its own dynamic energy saving algorithm.

For example, as illustrated in FIGS. 4-6, call manager 104 is configured to determine how many DSPs belonging to DSP Farms 118, 120, 122 should be maintained in a ready state and how many can be maintained in a dormant, or first energy saving, state. Call manager 104 selects the DSPs from DSP Farms 118, 120, 122 to remain in the ready state and signals them via network 102. Call manager 104 also selects DSPs from DSP Farms 118, 120, 122 that should remain in the dormant state and signals them via network 102. Any additional DSPs can be put in a reset state (or second energy saving state). Call manager 104 may signal DSP Farms 118, 120, 122 to put the additional DSPs (or PVDMs) into a reset mode.

In an example embodiment, call manager 104 is configured to switch a digital signal processor from the first energy saving state to the ready state responsive to determining an increase of the first number of digital signal processors to be maintained in a ready state. For example, as call volume increases, the number of digital signal processors to be maintained in the ready state may increase. In an example embodiment, call manager 104 may employ a credit scheme for determining how many DSPs should be maintained in the ready state. For example, the resources available from a DSP can be assigned a 'credit' value such as 180 credits. If each voice call uses a certain amount of DSP resources, for example ⅙ of the DSP's resources, then the voice call is deemed to use 30 credits. When the available credits on a DSP (or the combined credits of a pool of DSPs) reaches a predetermined threshold, call manager 104 may transition additional DSPs to the ready state to maintain adequate capacity for handling calls on network 102.

In particular embodiments, call manager 104 may be further configured to switch a digital signal processor from the second energy saving state to the first energy saving state responsive to determining an increase of the first number of digital signal processors to be maintained in a ready state. For example, as a DSP is transitioned from the 'dormant' state to the 'ready' state, call manger may also transition a DSP form the "Reset" state to the 'dormant' state in order to maintain a desired amount of DSP resources in the 'dormant' state. For example, a credit scheme as described herein supra may also be employed to determine how many DSPs should be maintained in the 'dormant' state.

In an example embodiment, call manager 104 may be configured to base the amount of DSP resources to maintain in the 'ready' state and 'dormant' state based on call volume, anticipated (or surge) call volume, and/or the time of day. For example, fewer DSP resources may be needed at night than during business hours and call manager 104 can be configured to maintain DSPs in the 'ready' and 'dormant' states accordingly.

In an example embodiment, call manager 104 is configured to switch a digital signal processor from the ready state to the first energy saving state responsive to determining a decrease of the first number of digital signal processors to be maintained in a ready state. For example, as call volume decreases, the number of DSP resources that are maintained in the 'ready' state can be decreased.

In particular embodiments, call manager 104 may be further configured to switch a digital signal processor from the first energy saving state to the second energy saving state responsive to determining a decrease of the first number of digital signal processors to be maintained in a ready state. For example, as DSPs are switched from the 'ready' state to the 'dormant' state, DSPs additional DSPs in the dormant state can be placed in the 'reset' state.

In an example embodiment, call manager 104 may determine which mode to put a DSP Farm, PVDM and/or DSP in based on the processing tasks being performed by the DSP (or DSPs within a PVDM and/or DSP Farm). For example, digital signal processors that are handling time domain multiplexing termination services may be maintained in the ready state. As another example, digital signal processors that will be handling digital signal processor farm services may be maintained in the first power save state. Yet another example, digital signal processors that will be handling primary rate interface (PRI) services may be maintained in the first power save state.

Figure 7:
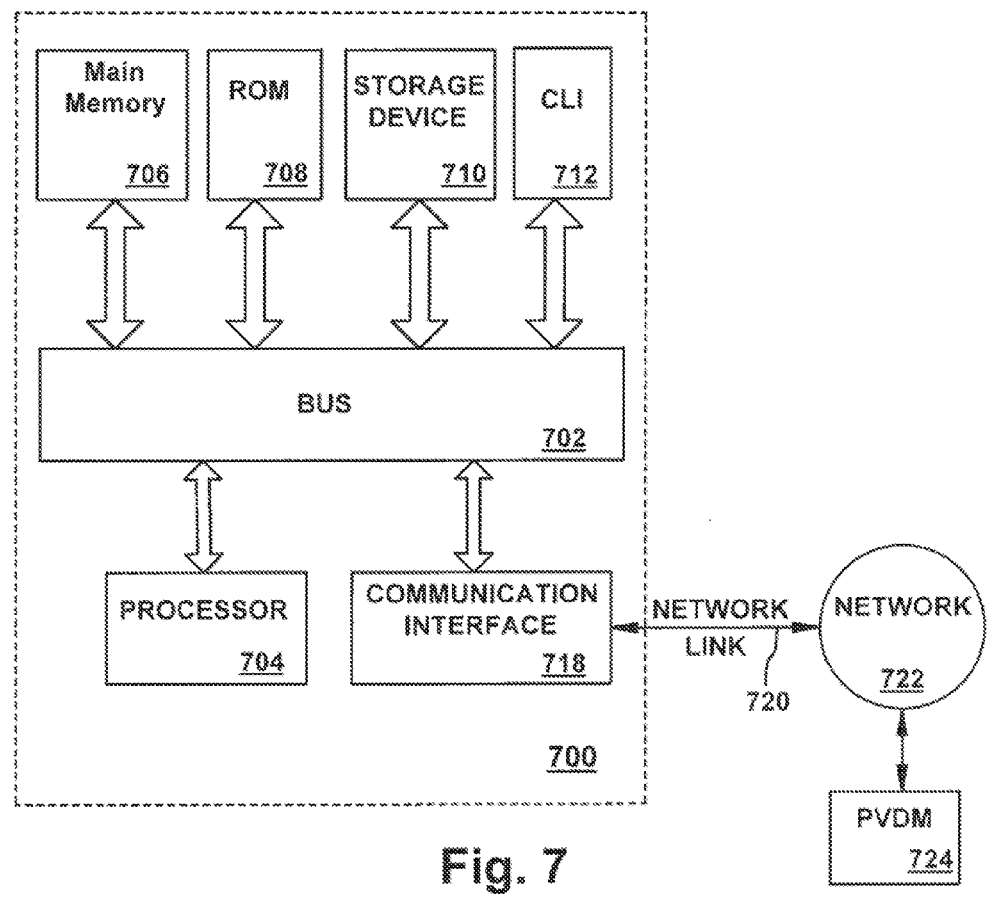
FIG. 7 illustrates an example of a computer system upon which an example embodiment may be implemented.

FIG. 7 illustrates an example a computer system 700 upon which an example embodiment may be implemented. For example, computer system 700 may be employed to implement the logic for performing the functionality of the example embodiments described herein. For example, computer system 700 may be employed to implement the functionality of call manager 104.

Computer system 700 includes a bus 702 or other communication mechanism for communicating information and a processor 704 coupled with bus 702 for processing information. Computer system 700 also includes a main memory 706, such as random access memory (RAM) or other dynamic storage device coupled to bus 702 for storing information and instructions to be executed by processor 704. Main memory 706 also may be used for storing a temporary variable or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled to a Command Line Interface (CLI) 712 via bus 702. CLI 712 may suitably comprise to a display 712 for displaying information to a computer user, and an input device such as a keyboard including alphanumeric and other keys for communicating information, configuration and command selections to processor 704.

An aspect of an example embodiment is related to the use of computer system 700 for implementing dynamic energy savings for a Packet Voice Digital Signal Processor Module (PVDM). According to an example embodiment, implementing dynamic energy savings for a PVDM is provided by computer system 700 in response to processor 704 executing one or more sequences of one or more instructions contained in main memory 706. Such instructions may be read into main memory 706 from another computer-readable medium, such as storage device 710. Execution of the sequence of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 704 for execution. Such a medium may take many forms, including but not limited to non-volatile media, and volatile media. Non-volatile media include for example optical or magnetic disks, such as storage device 710. Volatile media include dynamic memory such as main memory 706. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 704 for execution. For example, the instructions may initially be borne on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706 from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling computer system 700 to a network link 720 that is connected to a local network 722. A PVDM 724 (or a plurality of PVDMs) may be coupled to network 722. Communication interface 718 enables processor 704 to communicate with PVDM 724 and provide commands to PVDM 724 such as when to operate in a 'ready' state, 'dormant' state, or 'reset' stare.

For example, communication interface 718 may be a local area network (LAN) card to provide a data communication connection to a compatible LAN. As another example, communication interface 718 may be an integrated services digital network (ISDN) card or a modem to provide a data communication connection to a corresponding type of telephone line. Wireless links may also be implemented. In any such implementation, communication interface 718 sends and receives electrical, electromagnetic, or optical signals that carry digital data streams representing various types of information.

Computer system 700 can send messages and receive data, including program codes, through the network(s), network link 720, and communication interface 718. In accordance with an example embodiment, one such downloaded application provides for implementing dynamic energy savings for a Packet Voice Digital Signal Processor Module (PVDM) as described herein.

Figure 8:
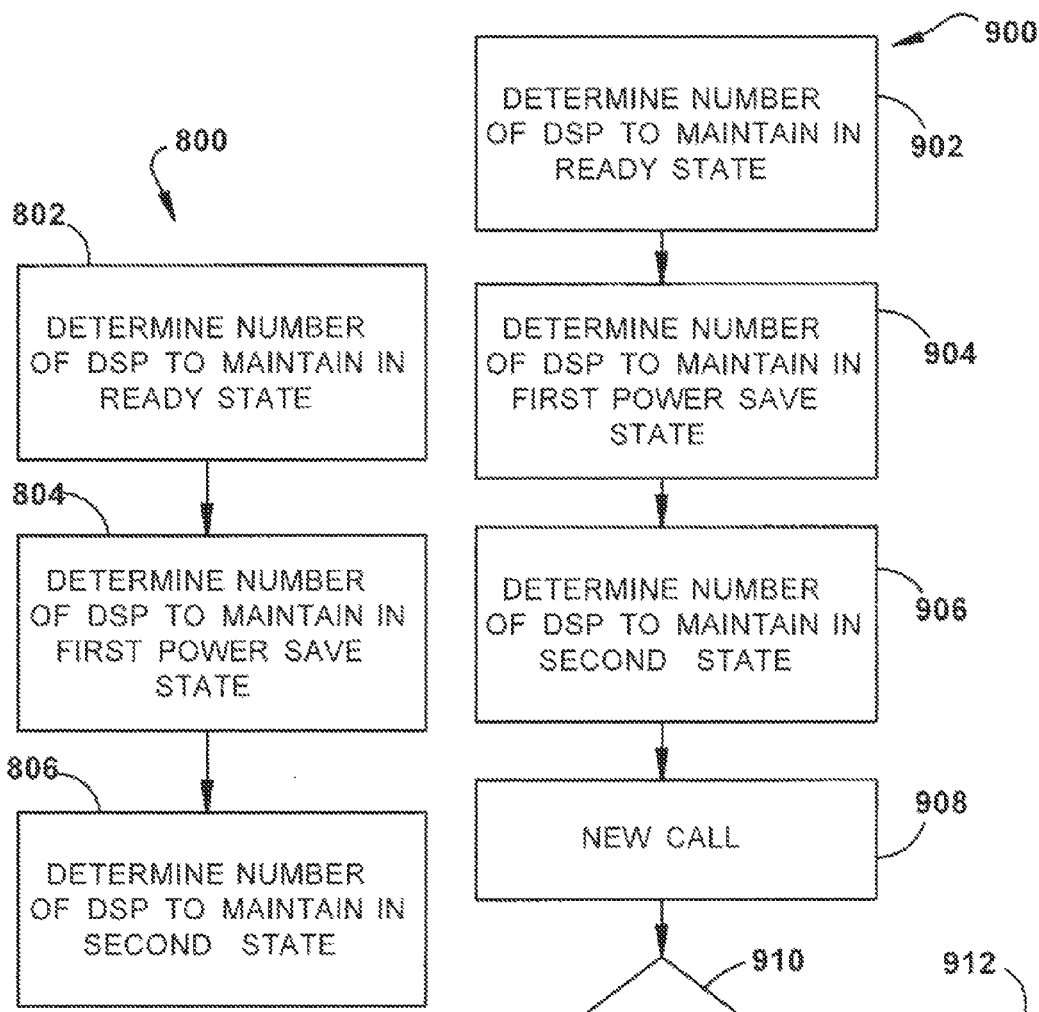
FIG. 8 illustrates an example of a methodology for implementing energy savings for a network employing a plurality of digital signal processors.
Figure 9:
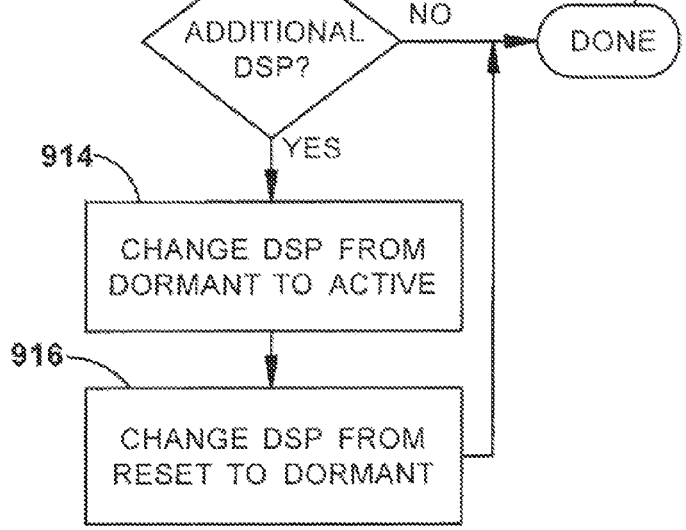
FIG. 9 illustrates an example of a methodology for implementing energy savings for a network employing a plurality of digital signal processors when an event occurs which may require additional digital signal processing capacity.
Figure 10:
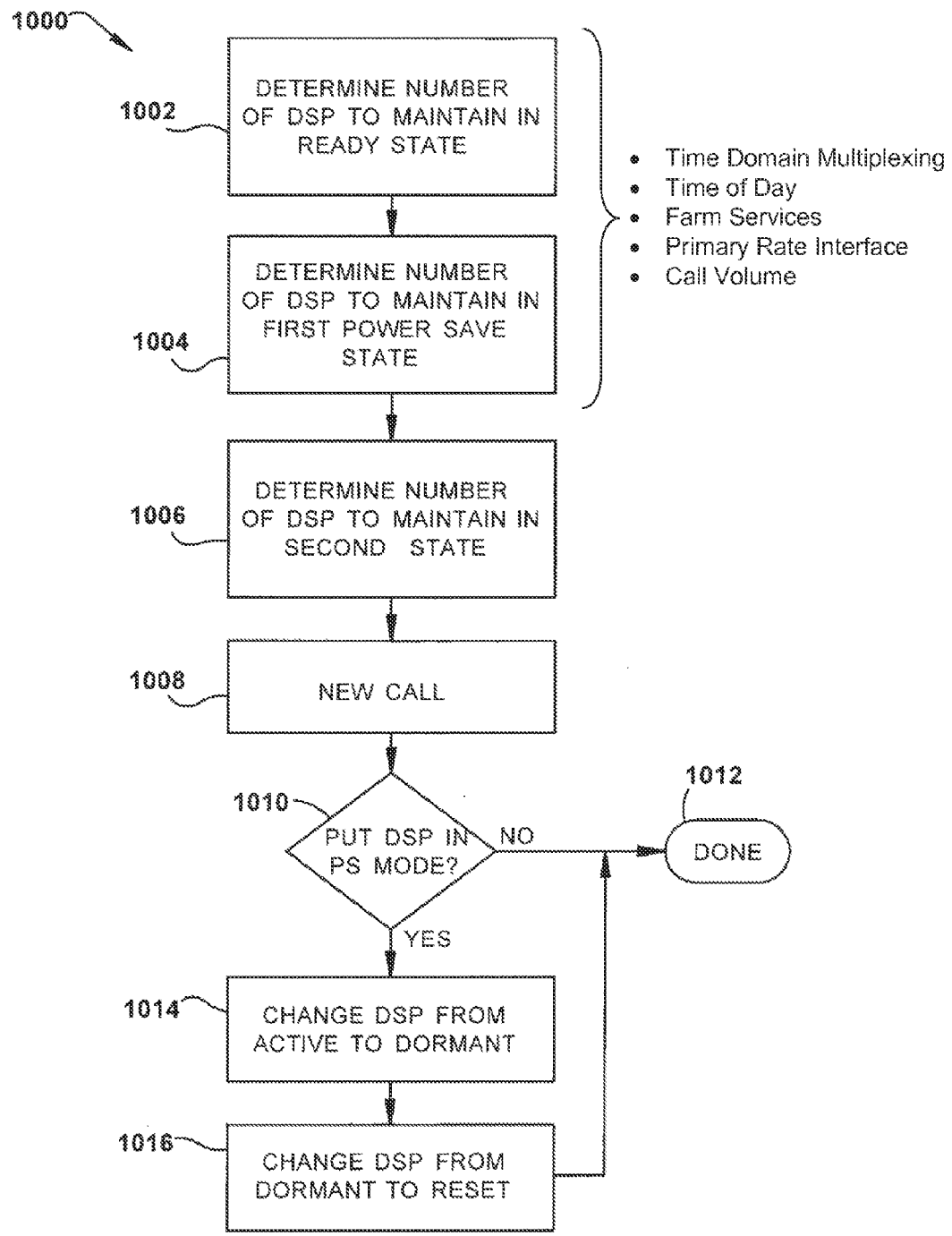
FIG. 10 illustrates an example of a methodology for implementing energy savings for a network employing a plurality of digital signal processors when an event occurs which may reduce required digital signal processing capacity.

In view of the foregoing structural and functional features described above, methodologies in accordance with example embodiments will be better appreciated with reference to FIGS. 8-10. While, for purposes of simplicity of explanation, the methodologies of FIGS. 8-10 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement the illustrated methodology. The methodologies described herein are suitably adapted to be implemented in hardware, software, or a combination thereof.

FIG. 8 illustrates an example of a methodology 800 for implementing energy savings for a network employing a plurality of digital signal processors. Methodology 800 is suitable for implementing dynamic energy savings for a PVDM or any network employing digital signal processors. In an example embodiment, methodology 800 can be implemented within a router; however, in other embodiments methodology 800 can be implemented by any device on the network which can monitor DSP capacity. In accordance with an example embodiment, methodology 800 attempts to place DSPs in the lowest possible power consumption state to maximize energy savings.

At 802, the number of DSPs to be maintained in a ready state is determined. The number of DSPs to be maintained in a ready state may vary based on call volume, anticipated call volume (or potential call surge), time of day and/or type of DSP services being provided such as Digital Voice, Analog Voice, PRI, DSP Farm, TDM termination, etc. The ready state provides the least (if any) amount of power savings and thus in an example embodiment it is desirable to minimize the number of DSPs in the ready state.

At 804, the number of DSPs to be maintained in a dormant state is determined. DSPs in the dormant state can be transitioned to the ready state quickly, for example in 1 millisecond; therefore, DSPs performing tasks that can tolerate the latency introduced waiting for the DSP to transition from the dormant state to the ready state can be put in the dormant state. Moreover, the number of DSPs to be maintained in a dormant state may vary based on call volume, anticipated call volume (or potential call surge), time of day and/or type of DSP services being provided such as Digital Voice, Analog Voice, PRI, DSP Farm, TDM termination, etc.

At 806, the number of DSPs to be maintained in a reset state is determined. The reset state provides the most energy savings, however, it takes longer to transition from the reset stare to the ready state so DSPs not currently performing tasks or not anticipated to be needed for an amount of time at least as long as the transition time from reset mode to ready mode should be put in the reset state. In an example embodiment, any DSP not allocated to the ready state or dormant state can be put into the reset state.

FIG. 9 illustrates an example of a methodology 900 for implementing energy savings for a network employing a plurality of digital signal processors when an event occurs which may require additional digital signal processing capacity. Methodology 900 is suitable for implementing dynamic energy savings for a PVDM or any network employing digital signal processors. In an example embodiment, methodology 900 can be implemented within a router. In accordance with an example embodiment, methodology 900 attempts to place DSPs in the lowest possible power consumption state to maximize energy savings.

At 902, the number of DSPs to be maintained in a ready state is determined. The number of DSPs to be maintained in a ready state may vary based on call volume, anticipated call volume (or potential call surge), time of day and/or type of DSP services being provided such as Digital Voice, Analog Voice, PRI, DSP Farm, TDM termination, etc. The ready state provides the least (if any) amount of power savings and thus in an example embodiment it is desirable to minimize the number of DSPs in the ready state.

At 904, the number of DSPs to be maintained in a dormant state, or a plurality of dormant states, is determined. DSPs in the dormant state can be transitioned to the ready state quickly, for example in 1 millisecond; therefore, DSPs performing tasks that can tolerate the latency introduced waiting for the DSP to transition from the dormant state to the ready state can be put in the dormant state. Moreover, the number of DSPs to be maintained in a dormant state may vary based on call volume, anticipated call volume (or potential call surge), time of day and/or type of DSP services being provided such as Digital Voice, Analog Voice, PRI, DSP Farm, TDM termination, etc.

At 906, the number of DSPs to be maintained in a reset state is determined. The reset state provides the most energy savings, however, it takes longer to transition from the reset state to the ready state so DSPs not currently performing tasks or not anticipated to be needed for an amount of time at least as long as the transition time from reset mode to ready mode should be put in the reset state. In an example embodiment, any DSP not allocated to the ready state or dormant state can be put into the reset state.

At 908, an event occurs which increases the utilization of DSP resources. For example a new call may be received, an increase in call volume may be occurring, an increase in call volume may be anticipated (for example at the beginning of business hours when it is anticipated that additional telephone resources will soon be needed), a combination of the aforementioned activities, or any other event which increases the utilization of DSP resources.

At 910, a determination is made whether an additional DSP should be employed to service the increased utilization of DSP resources. This determination may be based on the level of current and/or anticipated DSP needs. For example, if a new call is received and current DSP resources are still adequate, then an additional DSP would not be employed.

If, at 910, a determination is made that no additional DSPs are needed (NO), at 912, the methodology 900 is completed. Methodology 900 (or parts of methodology 900 such as 908, 910, 912, 914, 916) may be restarted whenever an event occurs that increases utilization of DSP resources, or as will be illustrated in FIG. 10, decreases DSP resources.

If, at 910, a determination was made to employ an additional DSP (YES), at 914 a DSP is switched form the dormant state to the active state. In an example embodiment, more than DSP may be transitioned from the dormant stare to the active state at 914. Optionally, at 916, one or more DSPs may be transitioned from the reset state to the active state. After 914 and/or 916 have completed, at 912, the methodology 900 is completed. As noted herein supra, methodology 900 (or a portion of methodology 900 such as 908, 910, 912, 914, 916) may be restarted whenever an event occurs that increases utilization of DSP resources.

FIG. 10 illustrates an example of a methodology 1000 for implementing energy savings for a network employing a plurality of digital signal processors when an event occurs which may reduce required digital signal processing capacity. Methodology 1000 is suitable for implementing dynamic energy savings for a PVDM or any network employing digital signal processors. In an example embodiment, methodology 1000 can be implemented by a call manager; however, in other embodiments methodology 1000 can be implemented by any device on the network which can monitor DSP capacity. In accordance with an example embodiment, methodology 1000 attempts to place DSPs in the lowest possible power consumption state to maximize energy savings.

At 1002, the number of DSPs to be maintained in a ready state is determined. The number of DSPs to be maintained in a ready state may vary based on call volume, anticipated call volume (or potential call surge), time of day and/or type of DSP services being provided such as Digital Voice, Analog Voice, PRI, DSP Farm, TDM termination, etc. The ready state provides the least (if any) amount of power savings and thus in an example embodiment it is desirable to minimize the number of DSPs in the ready state.

At 1004, the number of DSPs to be maintained in a dormant state is determined. DSPs in the dormant state can be transitioned to the ready state quickly, for example in 1 millisecond; therefore, DSPs performing tasks that can tolerate the latency introduced waiting for the DSP to transition from the dormant state to the ready state can be put in the dormant stare. Moreover, the number of DSPs to be maintained in a dormant state may vary based on call volume, anticipated call volume (or potential call surge), time of day and/or type of DSP services being provided such as Digital Voice, Analog Voice, PRI, DSP Farm, TDM termination, etc.

At 1006, the number of DSPs to be maintained in a reset state is determined. The reset state provides the most energy savings, however, it takes longer to transition from the reset state to the ready state so DSPs not currently performing tasks or not anticipated to be needed for an amount of time at least as long as the transition time from reset mode to ready mode should be put in the reset state. In an example embodiment, any DSP not allocated to the ready state or dormant state can be put into the reset state.

At 1008, an event occurs which decreases the utilization of DSP resources. For example a call may be terminated, a decrease in call volume may be occurring, a decrease in call volume may be anticipated (for example at the end of business hours when it is anticipated that fewer telephone resources will soon be needed), a combination of the aforementioned activities, or any other event which decreases the utilization of DSP resources.

At 1010, a determination is made whether an additional DSP can be put into an energy saving state due to the decreased utilization of DSP resources. This determination may be based on the level of current and/or anticipated DSP needs. For example, if a new call is terminated and a DSP is not being employed for other tasks, then the DSP can be put into an energy saving (e.g., dormant) mode.

If, at 1010, a determination is made that no additional DSPs can be put into an energy saving state (NO), at 1012, the methodology 1000 is completed. Methodology 1000 (or a portion of methodology 1000 such as 1008, 1010, 1012, 1014, 1016) may be restarted whenever an event occurs that decreases utilization of DSP resources.

If, at 1010, a determination was made to employ an additional DSP (YES), at 1014 a DSP is switched form the active state to the dormant state. In an example embodiment, more than DSP may be transitioned from the active state to the dormant state at 1014. Optionally, at 1016, one or more DSPs may be transitioned from the reset state to the active state. After 1014 and/or 1016 have completed, at 1012, the methodology 1000 is completed. As noted herein supra, methodology 1000 (or a portion of methodology 1000 such as 1008, 1010, 1012, 1014, 1016) may be restarted whenever an event occurs that increases utilization of DSP resources.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The flowchart and block diagrams in the figures illustrate the architecture, functionality, and operation of possible implementations of systems or methods according to various embodiments. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

In view of the foregoing, the scope of the present disclosure is determined by the claims that follow.

We claim:

1. A method of managing operating states of each of a plurality of digital signal processors (DSPs), each operating state selected from a group of at least three operating states including a ready state, a first energy-saving state, and a second energy-saving state, the method comprising:

determining, responsive to receiving one or more digital signal processing tasks of a predetermined type, a set of DSPs from the plurality of DSPs to handle digital signal processing tasks of the type;

determining, based at least in part on the type, a first number of the plurality of DSPs to operate in the ready state, wherein the set of DSPs includes at least one DSP in the ready state to handle the received one or more digital signal processing tasks;

determining a second number of the plurality of DSPs to operate in the first energy-saving state, wherein DSPs operated in the first energy-saving state are configured to transition to operation in the ready state within a predetermined amount of time, and wherein determining the second number of the plurality of DSPs to operate in the first energy-saving state comprises analyzing temporal data associated with a plurality of calls;

determining a third number of the plurality of DSPs to operate in the second energy-saving state; and signaling each of the plurality of DSPs to operate in a respective operating state consistent with the determined first, second, and third numbers.

2. The method of claim 1, wherein determining the first, second, and third numbers of DSPs is based on a current system load, and is further based on a transition time from the first energy-saving state to the ready state.

3. The method of claim 2, wherein determining the first, second, and third numbers of DSPs is further based on a transition time from the second energy-saving state to the ready state.

4. The method of claim 1, wherein the first energy-saving state corresponds to a dormant mode of the plurality of DSPs, and the second energy-saving state corresponds to a reset mode of the plurality of DSPs.

5. The method of claim 1, further comprising:
transitioning, upon determining an increase to the first number of DSPs, at least one DSP from the first energy-saving state to the ready state.

6. The method of claim 5, further comprising:
transitioning, upon determining the increase to the first number of DSPs, at least one DSP from the second energy-saving state to the first energy-saving state.

7. The method of claim 1, further comprising:
transitioning, upon determining a decrease to the first number of DSPs, at least one DSP from the ready state to the first energy-saving state.

8. The method of claim 7, further comprising:
transitioning, upon determining the decrease to the first number of DSPs, at least one DSP from the first energy-saving state to the second energy-saving state.

9. The method of claim 1, wherein the selected type of digital signal processing tasks is time domain multiplexing (TDM) termination services, the method further comprising:
maintaining operation of at least a first DSP allocated for signaling for the TDM termination services, and which is selected from the determined set of DSPs, within a group consisting of the ready state and the first energy-saving state; and
maintaining operation of at least a second DSP allocated for voice channels for the TDM termination services, which is selected from the determined set of DSPs, and which is not currently in use, within a group consisting of the first and second energy-saving states.

10. The method of claim 1, wherein the selected type of digital signal processing tasks is DSP farm services, the method further comprising:
maintaining operation of each of the determined set of DSPs within a group consisting of the ready state and the first energy-saving state.

11. The method of claim 1, wherein the selected type of digital signal processing tasks is primary rate interface (PRI) services, the method further comprising:
maintaining operation of each of the determined set of DSPs within the first energy-saving state.

12. The method of claim 1, wherein determining the first number of the plurality of DSPs is based on a current call volume, wherein determining the second number of the plurality of DSPs is based on a plurality of factors selected from a group comprising an anticipated call volume within a predetermined time period, a time of day, and a type of digital signal processing services currently provided.

13. The method of claim 12, wherein the type of digital signal processing services currently provided includes one of digital voice services, analog voice services, primary rate interface (PRI) services, DSP farm services, and time domain multiplexing (TDM) termination services.

14. A method of managing operating states of each of a plurality of digital signal processors (DSPs), each operating state selected from a group of at least three operating states including a ready state, a first energy-saving state, and a second energy-saving state, the method comprising:
determining, responsive to receiving one or more digital signal processing tasks of a predetermined type, a set of DSPs from the plurality of DSPs to handle digital signal processing tasks of the type;
determining, based at least in part on the type and on a current call volume, a first number of the plurality of DSPs to operate in the ready state, wherein the set of DSPs includes at least one DSP in the ready state to handle the received one or more digital signal processing tasks;
determining, based on an anticipated call volume within a predetermined time period, a second number of the plurality of DSPs to operate in the first energy-saving state;
determining a third number of the plurality of DSPs to operate in the second energy-saving state; and
signaling each of the plurality of DSPs to operate in a respective operating state consistent with the determined first, second, and third numbers.

15. The method of claim 14, wherein the predetermined type of digital signal processing tasks is one of digital voice services, analog voice services, primary rate interface (PRI) services, DSP farm services, and time domain multiplexing (TDM) termination services.

16. The method of claim 14, wherein DSPs operated in the first energy-saving state are configured to transition to operation in the ready state within a predetermined amount of time.

17. A method of managing operating states of each of a plurality of digital signal processors (DSPs), each operating state selected from a group of at least three operating states including a ready state, a first energy-saving state, and a second energy-saving state, the method comprising:
determining, responsive to receiving one or more digital signal processing tasks of a predetermined type, a set of DSPs from the plurality of DSPs to handle digital signal processing tasks of the type;
determining, based at least in part on the type and on a current call volume, a first number of the plurality of DSPs to operate in the ready state, wherein the set of DSPs includes at least one DSP in the ready state to handle the received one or more digital signal processing tasks;
determining, based on a time of day, a second number of the plurality of DSPs to operate in the first energy-saving state;
determining a third number of the plurality of DSPs to operate in the second energy-saving state; and
signaling each of the plurality of DSPs to operate in a respective operating state consistent with the determined first, second, and third numbers.

18. The method of claim 17, wherein the predetermined type of digital signal processing tasks is one of digital voice services, analog voice services, primary rate interface (PRI) services, DSP farm services, and time domain multiplexing (TDM) termination services.

19. The method of claim 17, wherein DSPs operated in the first energy-saving state are configured to transition to operation in the ready state within a predetermined amount of time.

* * * * *

UNITED STATES PATENT AND TRADEMARK OFFICE
CERTIFICATE OF CORRECTION

PATENT NO. : 9,710,052 B2  
APPLICATION NO. : 14/715049  
DATED : July 18, 2017  
INVENTOR(S) : Ming Chen et al.

It is certified that error appears in the above-identified patent and that said Letters Patent is hereby corrected as shown below:

In the Specification

In Column 5, Line 50, delete "DSP's," and insert -- DSPs, --, therefor.

In Column 6, Line 66, delete "dock" and insert -- clock --, therefor.

In Column 7, Line 13, delete "state," and insert -- state. --, therefor.

In Column 8, Line 38, delete "DSP's" and insert -- DSPs --, therefor.

In Column 10, Line 47, delete "stare." and insert -- state. --, therefor.

In Column 11, Line 48, delete "stare" and insert -- state --, therefor.

In Column 12, Line 51, delete "stare" and insert -- state --, therefor.

In Column 13, Line 12, delete "TOM" and insert -- TDM --, therefor.

In Column 13, Line 22, delete "stare." and insert -- state. --, therefor.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*